United States Patent [19]

Hancock et al.

[11] Patent Number: 4,941,116

[45] Date of Patent: Jul. 10, 1990

[54] ELLIPTICAL ARC GENERATOR FOR DISPLAY SYSTEMS

[75] Inventors: William R. Hancock, Cedar Crest; Paul J. Short; Thomas A. Weingartner, both of Albuquerque, all of N. Mex.

[73] Assignee: Honeywell Inc., Minneapolis, Minn.

[21] Appl. No.: 220,052

[22] Filed: Jul. 15, 1988

[51] Int. Cl.$^5$ .............................................. G06F 1/02
[52] U.S. Cl. .................................................. 364/718
[58] Field of Search ................................. 364/718, 720

[56] References Cited

U.S. PATENT DOCUMENTS

| | | | |
|---|---|---|---|
| 3,917,932 | 11/1975 | Saita et al. | 364/720 |
| 4,736,201 | 4/1988 | Nakayama et al. | 364/720 |
| 4,789,954 | 12/1988 | Iida et al. | 364/718 |

Primary Examiner—David H. Malzahn
Attorney, Agent, or Firm—Seymour Levine; Roger W. Jensen; Albin Medved

[57] ABSTRACT

A symbol generator useful for stroke based and raster display systems provides the ability of generating ellipses and elliptical arc segments. A look-up table provides cosine and sine values for incremental angles which are multiplied by major and minor axis scale factors for a selected ellipse. Global input parameters permit rotation of all arcs and vectors to generate orthogonal projections, thereby producing 2-D and 3-D symbology.

23 Claims, 5 Drawing Sheets

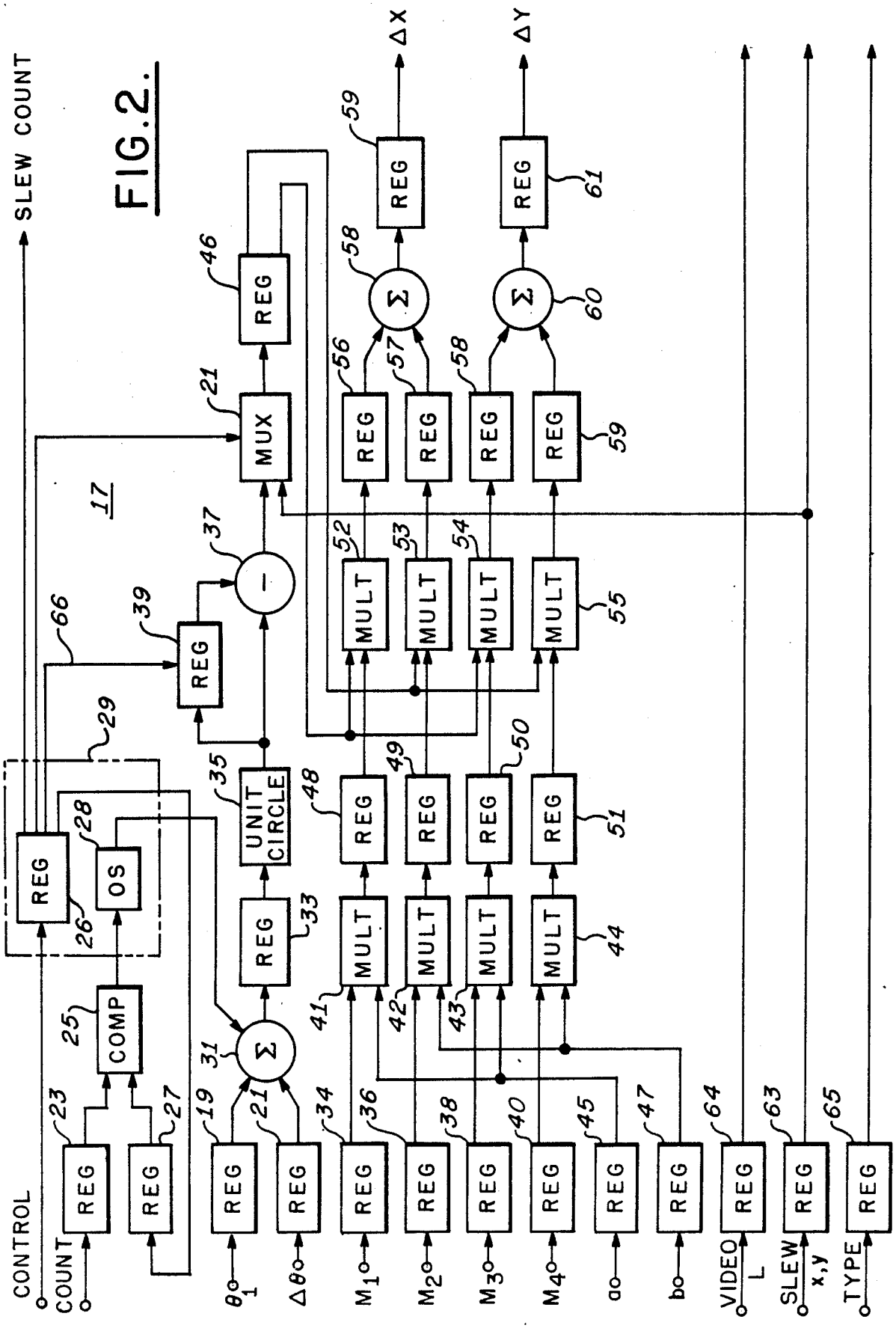

ELLIPTICAL ARC GENERATOR FOR DISPLAY SYSTEMS

BACKGROUND OF THE INVENTION

This invention was made with United States Government support and the United States Government has certain rights therein.

1. Field of the Invention

The present invention relates to the generation of vectors for display systems and more particularly to the generation of ellipses and elliptical arcs.

2. Description of the Prior Art

There is a need for the efficient and accurate generation of ellipses in display systems, particularly for the display of simulated three-dimensional formats. In addition, there is a need for a generalized curve generator that can efficiently and accurately draw objects which are neither straight nor circular.

In the prior art, curves are simulated with a series of short chained straight vectors that gradually change orientation to approximate the curvature. Some improvement over this method is achieved with the use of short chained circular arcs. Both methods, however, are memory and throughput inefficient due to the large numbers of segments needed to accurately reproduce the curves. An improvement in accuracy and efficiency over the chained straight line and circular arcs has been obtained with an ellipse generator having a limited number of eccentricities. This approach utilizes a stored set of unitary ellipses of variable eccentricities, which are scaled to achieve the desired display size. The limited number of eccentricities, however, limits the display accuracy and the rapidity with which the ellipse is generated in the high curvature sections significantly reduces the display luminance.

SUMMARY OF THE INVENTION

The above disadvantages of the prior art are obviated with the use of a unit circle to provide a parametric angle for determining Delta X and Y, normalized respectively to the major and minor axes of the desired ellipse. A large sine/cosine look-up table is utilized with small angle increments to establish short normalized Delta X and Y. These are then converted to the Delta X and Y for the ellipse and scaled to provide the desired size. Since circles and straight lines are special cases of an ellipse, all geometrical figures may be generated. Additionally, global parameters are provided to permit rotation and scaling of all arcs and vectors. A special luminance handling circuit permits linear shading of the resultant vectors to simulate depth during three-dimensional rotations and provides luminance correction when required for symbol generation in a direct draw mode.

BRIEF DESCRIPTION OF THE DRAWINGS

FIG. 2 is a block diagram of a circuit that may be employed as the ellipse and rotation generator in FIG. 1.

DESCRIPTION OF THE PREFERRED EMBODIMENTS

Figure 1:
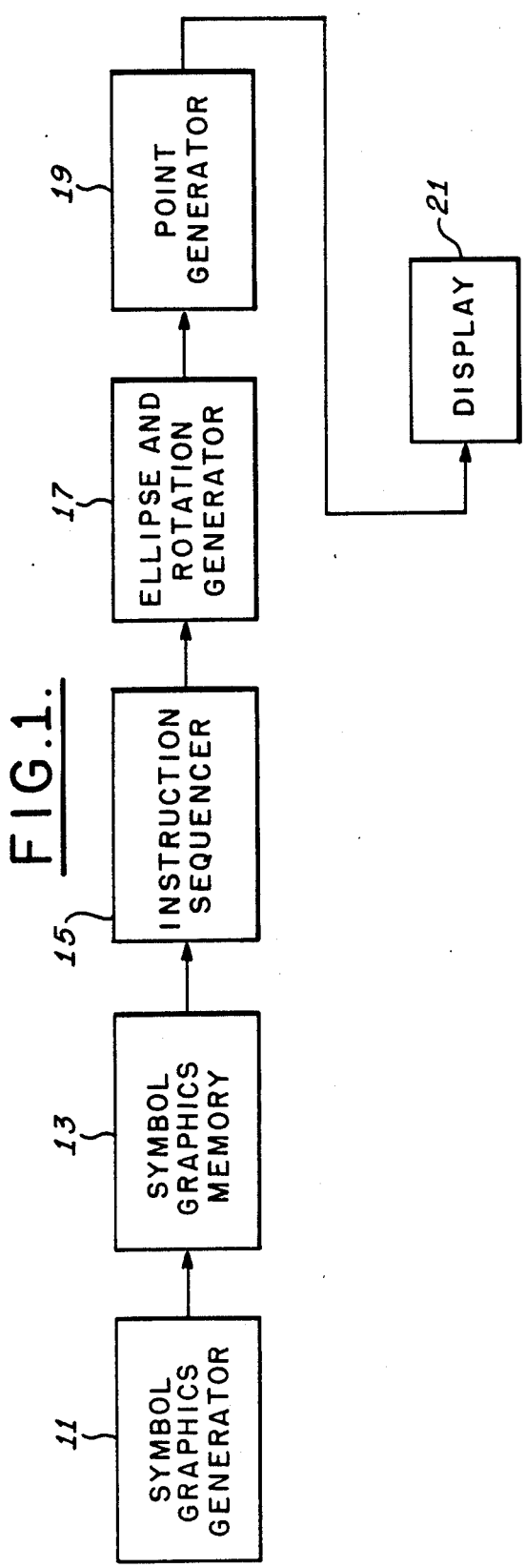
FIG. 1 is a functional block diagram of a symbol display system.

A block diagram of a symbol display system 10 is shown in FIG. 1. Vectors and vector positions required for displaying the symbols are generated in a symbol graphics generator 11 and stored in a symbol graphics memory 13. An instructional sequence 15 reads the symbol graphics memory 13 and converts the high level commands stored therein to low level commands which are coupled to an ellipse rotation generator 17 wherein the X and Y increments are generated and coupled to a point generator 19 which utilizes these increments to provide the X and Y positions to display 21.

Instructional sequencer 15 provides the initial angular position of the elliptical segment to be generated, the number of counts required to generate the segment, the angular increment Delta $\Theta$ for each count, axis rotation angles $M_1-M_4$, major axis scale factor "a" and minor axis scale factor "b", luminance signals, and slew commands. These low level commands are coupled to the ellipse and rotation generator 17, which may include the circuitry shown in FIG. 2.

Initial angles $\Theta_1$ of the segments to be drawn on the display are coupled to a register 19 and the angular increments Delta $\Theta$ to be utilized in generating each of the segments are coupled to a register 21. Each segment requires a specified count of Delta $\Theta$ for completion of the segment. These counts are coupled from the instruction sequencer 15 to register 23 and coupled therefrom to a comparator 25 to which the output of a register 27 is also coupled. An ellipse generator control 29, having a register 26 wherein control signals from the control sequencer 15 are stored, increments the count in register 27, with signals coupled form the register 26, with each Delta $\Theta$ applied to generate the elliptic segment. When the count of register 27 equals the count stored in register 23, comparator 25 couples a signal to an initialization signal generator in the ellipse generator control 29, which may be a one shot 28, wherefrom an initialization signal is coupled to an adder 31. At the completion of the elliptic segment, an initial Delta $\Theta$ for the next ellipse segment is coupled to the ellipse generator 17 and the process is repeated.

Initial angle value $\Theta_1$, for each segment, is coupled from the register 19 to a summation circuit 31, wherein the constant Delta $\Theta$ is added thereto. Sum output values from adder 31 may be coupled to a synchronizing register 33 and therefrom to a unit circle PROM 35 containing a look-up table of sine and cosine values over a 360° angular range. Each Delta $\Theta$ from register 21 is added to the previously calculated angle in adder 31 to establish the next angle for which the sine and cosine values are provided by the unit circle PROM 35. The output of the unit circle PROM is coupled to a subtraction circuit 37 and to a register 39, which couples the unit circle PROM output to a difference circuit 37 after a one count delay. Subtraction circuit 37 therefore provides a difference between the sine and cosine values for $\Theta$ and $\Theta + \Delta\Theta$.

Unit circle PROM 35 provides sine and cosine values of angles formed by the x-axis and lines extending from the origin to points on a unit circle which has been defined in relation to an ellipse by substituting.

$$x = a \cos \Theta$$

$$y = b \sin \Theta$$

for variables in the general ellipse equation $$(x/a)^2 + (y/b)^2 = 1$$

thereby providing the equation for a unit circle $\cos^2\Theta + \sin^2\Theta = 1$. It should be emphasized that the parametric angle $\Theta$ is not the angle formed between the x-axis and the line drawn from the origin to the point (x,y) on the ellipse. These two angles are related by:

$$\tan \Theta = (b/a) \tan \Theta_p$$

Figure 3:
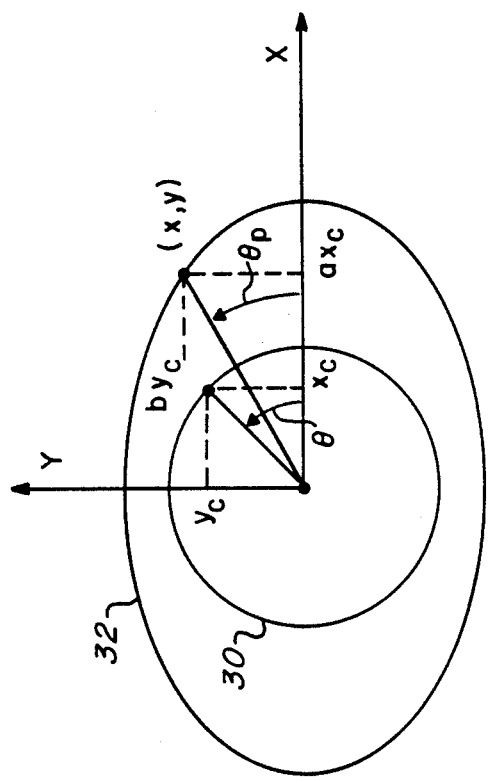
FIG. 3 is a geometric diagram illustrating the relationship between an ellipse and a unit circle corresponding thereto.

This relationship is illustrated in FIG. 3 wherein a unit circle 30 is shown inscribed in an ellipse 32.

For each Delta $\Theta$ increment, the point on the ellipse is $$X_i = a \cos(\Theta + i\Delta\Theta) + X_c$$

$$Y_i = b \sin(\Theta + i\Delta\Theta) + Y_c$$

These equations provide points (X,Y) on an unrotated ellipse having a major axis equal to "a", a minor axis equal to "b", and centered at the point ($X_c, Y_c$). The parameter i is incremented until the desired elliptical segment is completed. Since the ellipse and rotation generator 17 is designed to provide values of $\Delta X$ and $\Delta Y$, the point ($X_c, Y_c$) is not provided for it is cancelled with each difference ($X_{i+1} - X_i$) and ($Y_{i+1} - Y_i$).

Values $M_1$ through $M_4$ are functions of the rotation angles about the three major axes and are given as:

$$M_1 = \cos \Theta \cos \beta$$

$$M_2 = \sin\alpha\sin\Theta\cos\beta + \cos\alpha\sin\beta$$

$$M_3 = \cos \Theta \sin \beta$$

$$M_4 = \cos\alpha\cos\beta + \sin\alpha\sin\Theta\sin\beta$$

where:
 $\alpha$ = x axis rotation
 $\Theta$ = y axis rotation
 $\beta$ = z axis rotation These values are entered into registers 34, 36, 38, 40 and coupled therefrom to multipliers 41-44, respectively, herein $M_1$ and $M_3$ are multiplied by the scaled major axis "a" coupled through register 45 and $M_1$ and $M_4$ are multiplied by the scaled minor axis "b" coupled through register 47. Values $aM_1$, $bM_2$, $aM_3$, $bM_4$ are coupled through registers 48-51, respectively, to multipliers 52-55. In the absence of a slew command from ellipse generator control 29, multiplexer 21 directs the difference values $[\cos(\Theta_i+1) - \cos\Theta i]$ and $[\sin(\Theta_i+1) - \sin\Theta_i]$ to register 46, wherefrom the cosine difference is coupled to multipliers 52 and 54 and the sine difference to multipliers 53 and 55. The values coupled to multipliers 52-55 from registers 48-51 are functions of the scale factor and the rotation angle to be applied to the ellipse segment. In the absence of the rotation ($\alpha = \beta = \Theta = 0$), the output of the multipliers 52 and 55 are the Delta X and Delta Y, respectively, for the unrotated ellipse, while the output of the multipliers 53 and 54 are zero. The output of the multipliers 52 and 53, which are respectively $aM_1 \Delta \cos \Theta$ and $bM_2 \Delta \sin \Theta$, are respectively coupled through registers 56 and 57 to a summation network 58 wherein the output sum provided to register 59 is the increment $\Delta X$ for the elliptic segment.

Values at the output of the multipliers 54 and 55, which are respectively $aM_3 \cos \Theta$ and $bM_4 \Delta \sin \Theta$, are respectively coupled through registers 58 and 59 to a summation network 60 wherefrom the output sum coupled to register 61 is the increment $\Delta Y$ for the ellipse segment.

Relative slew commands are coupled through register 63 to the multiplexer 21. When a relative command is to be executed, ellipse generator control 29 signals multiplexer 21 to route the slew command to register 46 and therefrom to the scaling and rotation processing described above. In this manner, the slew is rotated in accordance with the desired character rotation to arrive at the proper point in the coordinate system. Absolute slew command is further processed as will be described with reference to FIG. 3, as will the video (luminance) and type commands coupled, respectively, to registers 64 and 65.

A straight line is an ellipse having a minor axis equal to zero. Consequently, such a line may be generated by the circuit of FIG. 2 by setting the minor axis scale factor b = 0. This procedure, however, converges very slowly towards the end of the line and therefore utilizes excessive processing time. A more efficient method for generating a straight line is to set both the major and minor axis scale factors "a" and "b" equal to 1 while setting $\Delta \Theta = 0$ and providing a signal from ellipse generator control 29 via line 66 to disable register 39. This procedure provides constant $\cos \Theta$ and $\sin \Theta$ values to the multipliers 52-55, thereby establishing each $\Delta X$ and $\Delta Y$ along the line.

Figure 4:
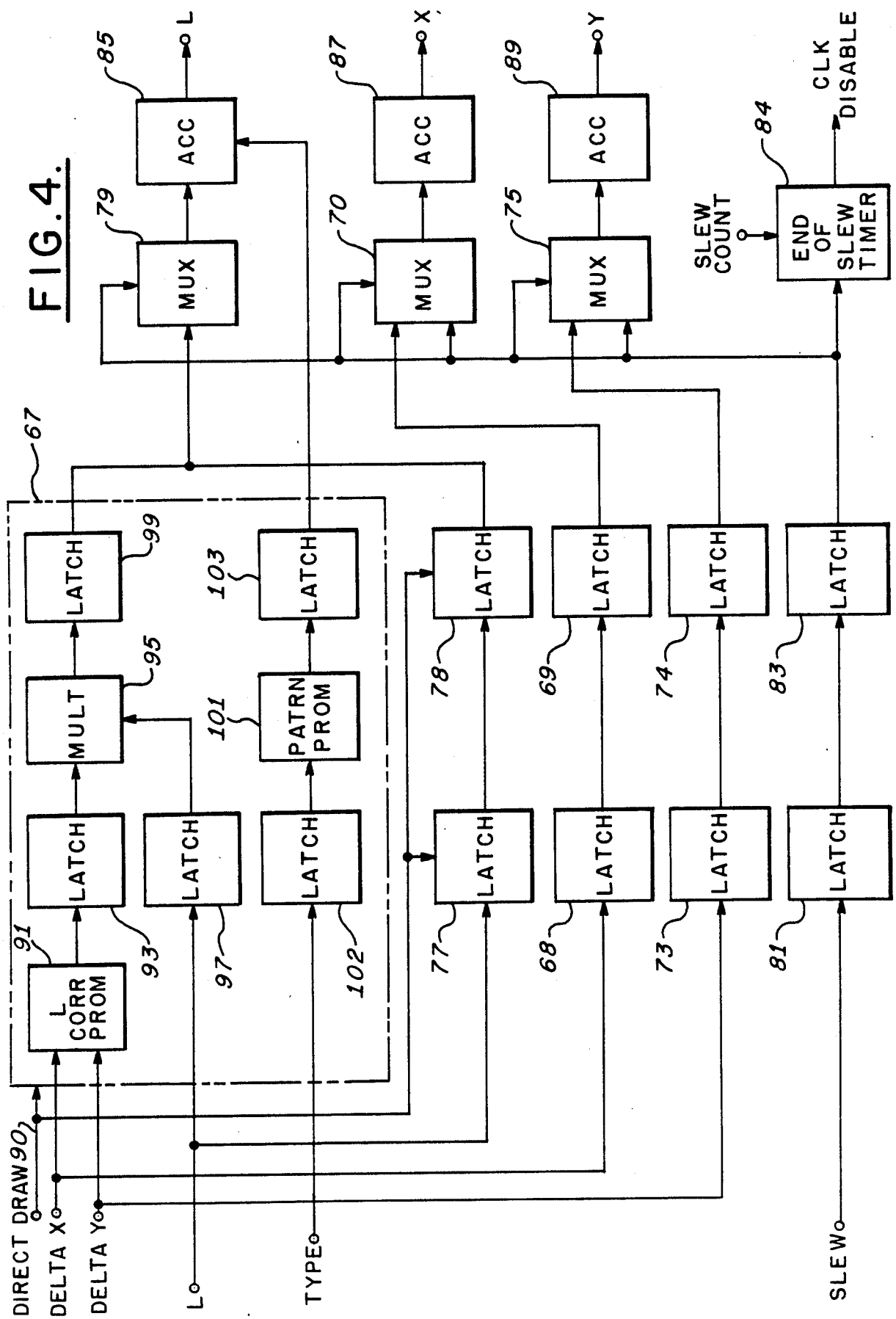
FIG. 4 is a block diagram of a circuit which may be employed as the point generator of FIG. 1.

Referring now to FIG. 4. $\Delta X$ values on register 59, $\Delta Y$ values from register 61, luminance levels from register 64, and type signals from register 65 may be coupled to a direct draw luminance circuit 67, yet to be described. In addition, $\Delta X$ values are coupled via latches 68 and 69 to a multiplexer 70, $\Delta Y$ values are coupled via latches 73 and 74 to a multiplexer 75, and luminance levels are coupled via latches 77 and 78 to a multiplexer 79. Slew signals from register 63 are coupled via latches 81 and 83 to the multiplexers 70 and 75. Slew tags accompanying the slew signals activate the multiplexer 79 to block luminance signals from entering an accumulator 85 and to activate multiplexers 70 and 75 to provide the slew X and Y values to accumulators 87 and 89, respectively, and therefrom to the display element. When a slew is performed in direct draw mode a slew timer 84 disables the clock for the slew count, coupled to the slew timer 84 from the ellipse generator 29. When this count is depleted, the clock is enabled and the processing continues.

In the absence of a slew signal and tag, $\Delta X$ values are coupled through latches 68, 69, and multiplexer 70 to an accumulator 87 wherefrom X values of the symbol for display are coupled to the display circuitry; $\Delta Y$ values are coupled via latches 73, 74, and multiplexer 75 to an accumulator 89 wherefrom Y values for the symbol to be displayed are coupled to the display circuitry; and luminance values are coupled via latches 77, 78 and multiplexer 79 to accumulator 85 wherefrom the luminance levels are provided to the display circuitry.

In direct draw systems, intensity levels provided to the display are inaccurate as $\cos \Theta$ approaches zero for characters formed with ellipses having a minor axis "b" much smaller than the major axis "a". This is caused by the relatively long processing time required to complete the ellipse in this region, causing the luminance to be averaged over a longer time interval than that for other segments of the ellipse. Luminance compensation for this condition is provided by a direct draw luminance circuit 67.

When a direct draw mode is selected, the direct draw luminance circuit 67 is activated and the latches 77 and 78 are disabled via a signal coupled to line 90. In this mode, $\Delta X$ and $\Delta Y$ values are coupled to a luminance correction PROM 91 wherefrom luminance correction multiplication factors that are functions of the lengths of $\Delta X$ and $\Delta Y$, are coupled to latch 93 and therefrom to multiplier circuit 95. Correction PROM 91 provides a multiplication factor from a look-up table which provides multiplication factors $F=\sqrt{(DX)^2+(DY)^2}$. Multiplier circuit 95 also receives luminance levels from latch 97 that were entered therein from register 64. The product of the luminance level times F, the correction multiplier, is coupled from multiplier 95 to a latch 99 and therefrom to an accumulator 85 via multiplexer 79 for coupling to the display circuitry. It should be recognized that latches 69, 74 and 83 are provided to establish synchronism for the $\Delta X$, $\Delta Y$ and slew signals along the pipeline with the luminance signals traversing the direct draw mode circuitry 67. As a result thereof, latch 78 must also be provided to insure synchronism of the four lines when the direct draw mode is not in operation. If a direct draw mode is not an available option, latches 69, 74, 78, and 83 may be eliminated.

Type signals, utilized in the direct draw mode only, entered into register 65 determine the line pattern for display. These patterns may be a series of dots, a series of dashes, dashes with dots interposed, to mention but a few. These type signals are coupled from register 65 to a pattern PROM 101, in the direct mode luminance circuitry 67, via latch 102. Pattern PROM 101 reads the type signals and provides able, disable signals to accumulator 85 via a latch 103 in accordance with the pattern type to be displayed.

Smooth and accurate ellipses are provided with a properly chosen $\Delta \Theta$. Selecting a $\Delta \Theta$ in accordance with a normalized step size equal to $a\sqrt{2+(1-\cos\Delta\Theta)}$ and providing a speed in accordance therewith provides the esthetics and accuracy desired.

The invention as described above generates elliptic characters in accordance with the following algorithm.
Loop
Save sine, cosine of theta and last sine, last cosine
*Theta = theta + delta theta*
$L_1 = a * M_1$
$L_2 = b * M_2$
$L_3 = a * M_3$
$L_4 = b * M_4$
Read sine, cosine of theta
$DX=L_1(cosine-last\ cosine)+L_2(sine-last\ sine)$
$DY=L_4(sine-last\ sine)-L_3(cosine-last\ cosine)$
$X=X+DX$
$Y=Y+DY$
*Count=Count−1*
Loop until count = 0
where M1, M2, M3, and M4 are defined as:
$M_1$ = cos (phi) cos beta
$M_2$ = sin (*alpha*) sin (*phi*) cos (*beta*) +cos (*alpha*) sin (*beta*)
$M_3$ = cos (phi) sin (beta)
$M_4$=cos (*alpha*) cos (*beta*)+sin (*alpha*) sin (*phi*) sin (*beta*)
alpha=x−axis rotation
phi=y−axis rotation
beta=z−axis rotation It should be recognized that variations to this algorithm and the implementation hardware may be made and yet provide characters within the scope of the invention.

Figure 5:
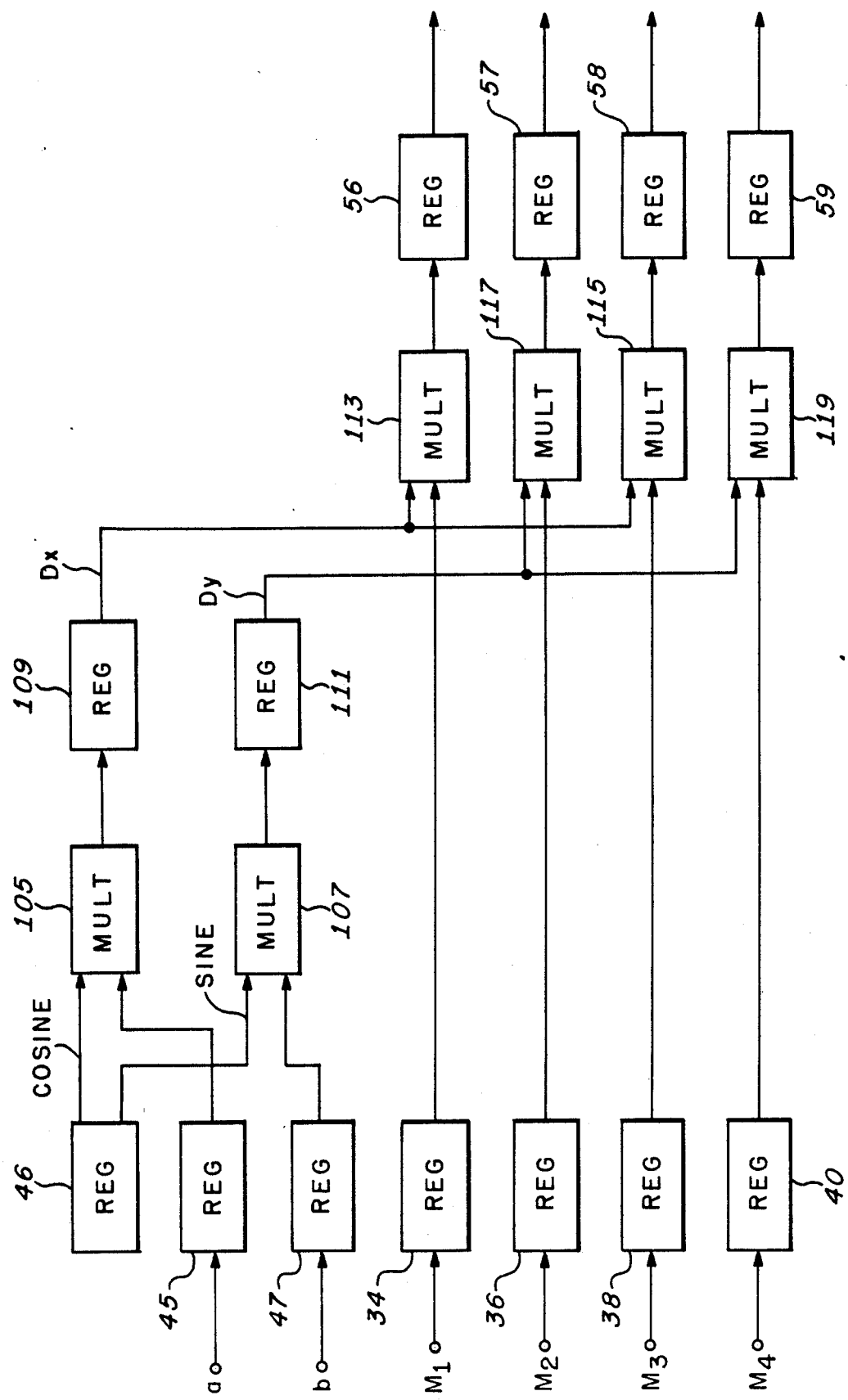
FIG. 5 is a block diagram of a circuit variation that may be employed in FIG. 2.
Figure 6:
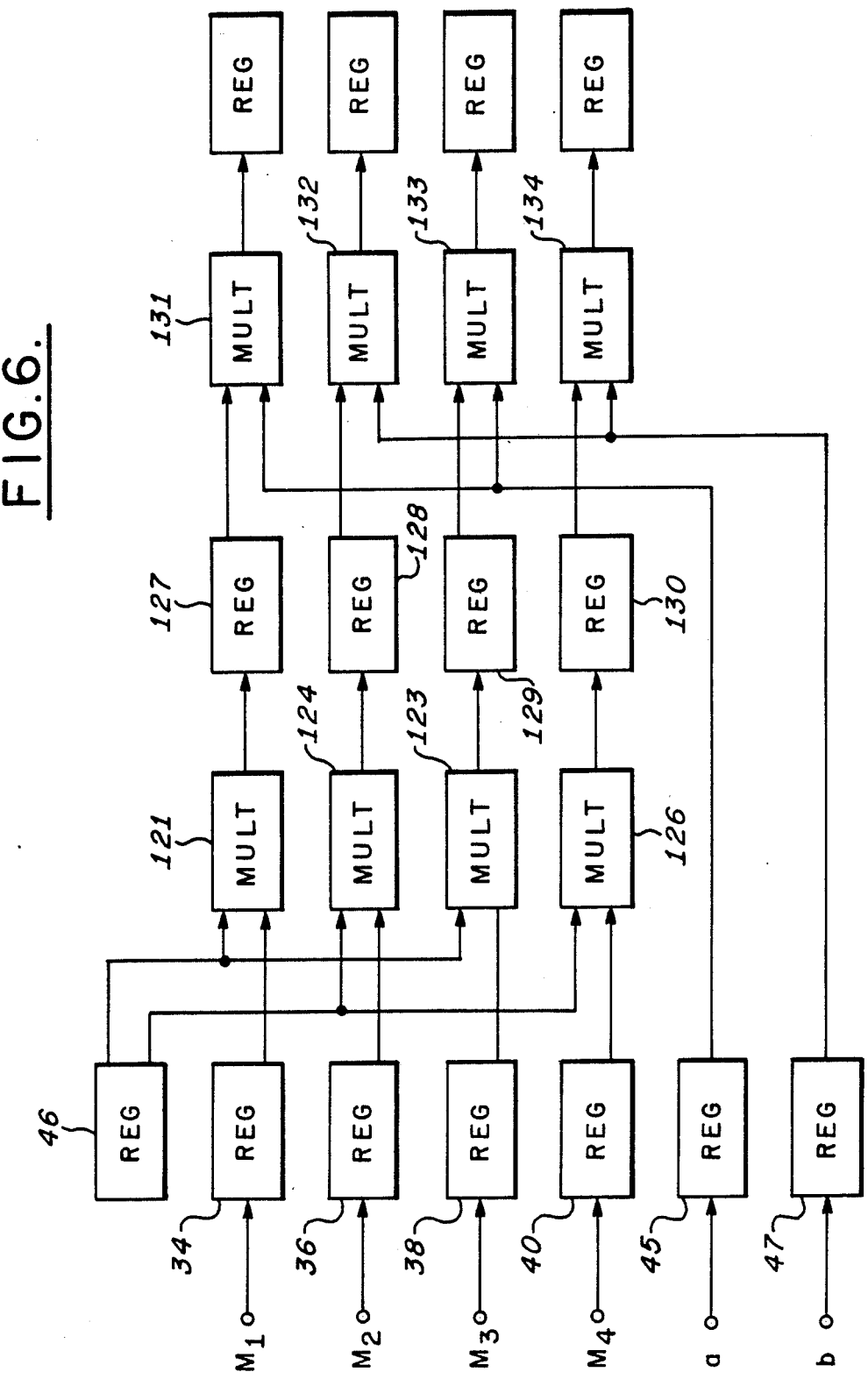
FIG. 6 is a block diagram of a second circuit variation that may be employed in FIG. 2.

Referring to FIG. 5, wherein elements previously discussed bear the originally numerical designations, the cosine and sine difference values from register 46 may be coupled respectively to multipliers 105 and 107 for multiplication by the major and minor axis scale factors "a" and "b", also coupled respectively to the multipliers 105 and 107, wherefrom the values $a[\cos \Theta_{i+1}-\cos \Theta_i]=Dx$ and $b[\sin \Theta_{i+1}-\sin \Theta_i]=Dy$ may be coupled to registers 109 and 111. The value Dx may be coupled to multipliers 113 and 115 wherein multiplication by $M_1$ and $M_3$, coupled from registers 23 and 38, is respectively performed. Similarly, Dy may be coupled to multipliers wherein multiplication by $M_2$ and $M_4$, coupled from registers 36 and 40, is respectively performed. This implementation generates elliptic characters in accordance with the following algorithm:
Loop
save sine, cosine of theta and last sine, last cosine
Theta + theta + delta theta
Read sine, cosine of theta
*DX=a*(cosine−last cosine)*
*DY=b*(sine−last sine)*
*Delta X=DX*M1+DY*M2*
*Delta Y=DY*M4−DX*M3*
*X=X+Delta X*
*Y=Y+Delta Y*
*Count=Count−1*
Loop until count = 0
where M1, M2, M3, and M4 are defined as:
M1 =cos(phi)cos(beta)
$M2=\sin(alpha)\sin(phi)\cos(beta)+\cos(alpha)\sin(beta)$
M3 =cos(phi)sin(beta)
$M4=\cos(alpha)\cos(beta)+\sin(aopha)\sin(phi)\sin(beta)$ FIG. 6 illustrates another circuit variation that may be employed to provide the desired elliptic arc segments. Cosine difference values may be coupled from register 46 to multipliers 121 and 123 and sine difference values may be coupled to multiplies 124 and 126. Multipliers 121, 124, 123, and 126 may also be coupled respectively to registers 34, 36, 38, and 40 to receive the values $M_1$, $M_2$, $M_3$, and $M_4$. The values obtained after multiplication are coupled through registers 127 through 130 and therefrom to multipliers 131 through 134. Products obtained after these second multiplications are coupled to registers 56 through 59 wherefrom the values aM1·(cos$\Theta_{i+1}$ −cos$\Theta_i$), bM2(sin $\Theta_{i+1}$ −sin$\Theta_i$), aM3(cos$\Theta_{i+1}$ −cos$\Theta_i$), and bM4(sin$\Theta_{i+1}$ −sin$\Theta_i$) are respectively provided. This implementation generates elliptic characters in accordance with the following algorithm:
Loop
save sine, cosine of theta and last sine, last cosine
*Theta =theta +delta theta*
Read sine, cosine of theta
*P1=M1(cosine−last cosine)*
*P2=M2(sine−last sine)*
*P3=M3(cosine−last cosine)*
*P4=M4(sine−last sine)*
*Delta X=a*P1+b*P2*
*Delta Y=b*P4−a*P3*
*X=X+Delta X*
*Y=Y+Delta Y*
*Count=count−1*
Loop until count = 0
where M1, M2, M3, and M4 are defined as:

M1 = cos(phi)cos(beta)
*M2 = sine(alpha)*sin(*phi*)cos(*beta*) + cos(*alpha*)sin(*beta*)
M3 = cos(phi)sin(beta)
*M4* = cos(*alpha*)cos(*beta*) + sin(*alpha*)sin(*phi*)sin(*beta*)

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. An elliptical arc segment generator for display system comprising:

means coupled to receive initial angle values and incremental angle values for incrementing said initial angle value by said incremental angle value to obtain cumulative angles and for providing cosine and sine differences for first and second cumulative angles to obtain sine and cosine difference values;

coordinate value means coupled to receive said cosine and sine difference values, major and minor axis scale factor values representative of major and minor axes of a preselected ellipse, and axis rotation values representative of axis rotations from respective reference axes for providing rotated incremental coordinate values;

means coupled to said product means for accumulating said rotated incremented coordinate values to establish a point on a display format; and means for providing luminance levels for display at said point.

2. An elliptical arc segment generator in accordance with claim 1 wherein said coordinate value means receives axis rotation values representative of axes rotations equal to zero and said sine and cosine difference means includes:

means coupled to receive said incremental angle values and said initial angle values for adding said incremental angle values to said initial angle values in a cumulative manner to obtain said cumulative angles;

means coupled to said adding means for providing sine and cosine values for said cumulative angle; and means coupled to said sine and cosine values means for providing sine and cosine difference values between a first cumulative angle and a second cumulative angle incremented with one less increment angle value than said first cumulative angle.

3. An elliptical arc segment generator in accordance with claim 1 wherein said sine and cosine difference means includes;

means coupled to receive said incremented angle values and said initial angle value for adding said incremental angle values to said initial angle value in a cumulative manner to obtain a cumulative angle;

means coupled to said adding means for providing sine and cosine values for said cumulative angle;

means coupled to said sine and cosine values means for providing sine and cosine difference values between a first cumulative angle and a second cumulative angle incremented with one less increment angle value than said first cumulative angle.

4. An elliptical arc generator in accordance with claim 3 wherein said coordinate value means includes:

first multiplying means coupled to receive said major and minor axis scale factor values and said axis rotation values for providing first product values representative of multiplication of said axis rotation values by said major and minor axis scale factors; and second multiplying means coupled to receive said first products and said sine and cosine difference values for providing second products representative of said first products multiplied by said sine and cosine difference values; and addition means coupled to receive said second products for selectively adding said second products to provide said incremented coordinate values.

5. An elliptic arc segment generator in accordance with claim 4 wherein said luminance levels means includes:

means coupled to receive said incremental coordinate values for providing luminance multiplicative factors in accordance with said incremental coordinate values; and means coupled to receive said luminance multiplicative factors and initial luminance levels for multiplying said initial luminance levels by said multiplicative factors to provide said luminance levels.

6. An elliptic arc segment generator in accordance with claim 5 further including means for controlling said luminance levels means to establish selected line patterns for display.

7. An elliptic arc segment generator in accordance with claim 5 further including means for controlling said luminance levels means to establish selected line patterns on said display.

8. An elliptic arc segment generator in accordance with claim 3 wherein said coordinate value means includes:

first multiplying means coupled to receive said major axis scale factor and selected axis rotation values for providing product values representative of multiplications of said selected axis rotation values by said major axis scale factor;

second multiplying means coupled to receive said minor axis scale factor and axis rotation values other than said selected axis rotation values for providing product values representative of multiplications of said axis rotation values other than said selected axis rotation values by said minor axis scale factors; and third multiplying means coupled to receive said product values from said first multiplying means and said cosine difference values for providing product values representative of multiplications of said cosine difference values by said product values from said first multiplying means; and fourth multiplying means coupled to receive said product values from said second multiplying means and sine difference values for providing product values representative of multiplications of said sine difference values by said product values with said second multiplying means.

9. An elliptical arc segment generator in accordance with claim 8 further including means constructed and arranged to be operative with said incrementing means such that said incrementing means provides cumulative angles that are equal to said initial angle value when said incremental angle value is equal to zero.

10. An elliptical arc segment generator in accordance with claim 9 further including slew means coupled to said accumulating means and said luminance levels means for disabling said luminance levels means during a slew command interval thereby removing luminance from said display and coupled to said accumulating means for providing a terminal point when said slew command interval terminates.

11. An elliptical arc segment generator in accordance with claim 3 wherein said coordinate value means includes:
first multiplying means coupled to receive said major and minor axis scale factor values and said sine and cosine difference values for providing first product values representative of said cosine difference value multiplied by said major axis scale factor and second product values representative of said sine difference value multiplied by said minor axis scale factor;
second multiplying means coupled to receive said first and second product values and said axis rotation values for providing third product values representative of said first product values multiplied by selected axis rotation values and fourth product values representative of said second product values multiplied by axis rotation values other than said selected axis rotation values.

12. An elliptical arc segment generator in accordance with claim 11 further including means constructed and arranged to be operative with said incrementing means such that said incrementing means provides cumulative angles that are equal to said initial angle value when said incremental angle value is equal to zero.

13. An elliptical arc segment generator in accordance with claim 12 further including slew means coupled to said accumulating means and said luminance levels means for disabling said luminance levels means during a slew command interval thereby removing luminance from said display and coupled to said accumulating means for providing a terminal point when said slew command interval terminates.

14. An elliptical arc segment generator in accordance with claim 3 wherein said coordinate value means includes:
first multiplying means coupled to receive said cosine and sine difference values and said axis rotation values for providing first product values representative of multiplications of said cosine difference values multiplied by selected axis rotation values and second product values representative of multiplications of said sine difference values multiplied by axis rotation value other than said selected axis rotation values; and
second multiplying means coupled to receive said first and second product values, and said major and minor axis scale factor for providing third product values representative of said first product values multiplied by said major axis scale factor and fourth product values representative of said second product values multiplied by said minor axis scale factor.

15. An elliptical arc segment generator in accordance with claim 14 further including means constructed and arranged to be operative with said incrementing means such that said incrementing means provides cumulative angles that are equal to said initial angle value when said incremental angle value is equal to zero.

16. An elliptical arc segment generator in accordance with claim 15 further including slew means coupled to said accumulating means and said luminance levels means for disabling said luminance levels means during a slew command interval thereby removing luminance from said display and coupled to said accumulating means for providing a terminal point when said slew command interval terminates.

17. An elliptical arc generator in accordance with claim 1 wherein said coordinate value means includes;
first multiplying means coupled to receive said major and minor axis scale factor values and said axis rotation values for providing first product values representative of multiplication of said axis rotation values by said major and minor axis scale factors;
second multiplying means coupled to receive said first products and said sine and cosine difference values for providing second products representative of said first products multiplied by said sine and cosine difference values; and
addition means coupled to receive said second products for selectively adding said second products to provide said incremented coordinate values.

18. An elliptic arc segment generator in accordance with claim 1 wherein said luminance levels means includes:
means coupled to receive said incremental coordinate values for providing a luminance multiplicative factor in accordance with said incremental coordinate values; and
means coupled to receive said luminance multiplicative factors and initial luminance levels for multiplying said initial luminance levels by said multiplicative factors to provide said luminance levels.

19. An elliptic arc segment generator in accordance with claim 1 wherein said coordinate value means includes:
first multiplying means coupled to receive said major axis scale factor and selected axis rotation values for providing product values representative of multiplications of said selected axis rotation values by said major axis scale factor;
second multiplying means coupled to receive said minor axis scale factor and axis rotation values other than said selected axis rotation values for providing product values representative of multiplications of said axis rotation values other than said selected axis rotation values by said minor axis scale factors; and
third multiplying means coupled to receive said product values from said first multiplying means and said cosine difference values for providing product values representative of multiplications of said cosine difference values by said product values from said first multiplying means: and
fourth multiplying means coupled to receive said product values from said second multiplying means and sine difference values for providing product values representative of multiplications of said second multiplying means by said sine difference value.

20. An elliptical arc segment generator in accordance with claim 1 wherein said product means includes:
first multiplying means coupled to receive said major and minor axis scale factor values and said sine and cosine difference values for providing first product values representative of said cosine difference value multiplied by said major axis scale factor and second product values representative of said sine difference value multiplied by said minor axis scale factor;

second multiplying means coupled to receive said first and second product values and said axis rotation values for providing third product values representative of said first product values multiplied by selected axis rotation values and fourth product values representative of said second product values multiplied by axis rotation values other than said selected axis rotation values.

21. An elliptical arc segment generator in accordance with claim 1 wherein said product means includes:

first multiplying means coupled to receive said cosine and sine difference values and said axis rotation values for providing first product values representative of multiplications of said cosine difference values multiplied by selected axis rotation values and second product values representative of multiplication of said sine difference values multiplied by axis rotation values other than said selected axis rotation values; and second multiplying means coupled to receive said first and second product values, and said major and minor axis scale factors for providing third product values representative of said first product values multiplied by said major axis scale factor and fourth product values representative of said second product values multiplied by said minor axis scale factor.

22. An elliptical arc segment generator in accordance with claim 1 further including means constructed and arranged to be operative with said incrementing means such that said incrementing means provides cumulative angles that are equal to said initial angle value when said incremental angle value is equal to zero.

23. An elliptical arc segment generator in accordance with claim 1 further including slew means coupled to said accumulating means and said luminance levels means for disabling said luminance levels means during a slew command interval thereby removing luminance from said display and coupled to said accumulating means for providing a terminal point when said slew command interval terminates.

* * * * *

UNITED STATES PATENT AND TRADEMARK OFFICE
CERTIFICATE OF CORRECTION

PATENT NO. : 4,941,116

DATED : July 10, 1990

INVENTOR(S) : William R. Hancock, et al

It is certified that error appears in the above-identified patent and that said Letters Patent is hereby corrected as shown below:

Col. 7, line 29;

Col. 10, line 60; and

Col. 11, line 10, "product" should read --coordinate value-- in all three instances Signed and Sealed this Twenty-seventh Day of August, 1991

Attest:

*Attesting Officer*

HARRY F. MANBECK, JR.

*Commissioner of Patents and Trademarks*